United States Patent
Yasuda

(10) Patent No.: US 7,040,762 B2
(45) Date of Patent: May 9, 2006

(54) PROJECTOR AND IMAGE PROJECTION SYSTEM

(75) Inventor: Hitoshi Yasuda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 72 days.

(21) Appl. No.: 10/853,801

(22) Filed: May 25, 2004

(65) Prior Publication Data

US 2004/0239887 A1  Dec. 2, 2004

(30) Foreign Application Priority Data

Jun. 2, 2003  (JP) ............................. 2003-156507

(51) Int. Cl.
- G03B 21/16 (2006.01)
- G03B 21/18 (2006.01)
- G03B 21/20 (2006.01)
- F21V 29/00 (2006.01)
- F21V 7/20 (2006.01)
- H04N 5/74 (2006.01)

(52) U.S. Cl. ............................. 353/52; 353/57; 353/85; 362/294; 362/345; 349/161; 348/748

(58) Field of Classification Search ................ 353/57, 353/52, 60, 85, 86; 362/264, 294, 345, 373, 362/580; 349/161; 348/748
See application file for complete search history.

(56) References Cited

U.S. PATENT DOCUMENTS 5,597,223 A * 1/1997 Watanabe et al. ............. 353/97
6,472,828 B1 * 10/2002 Pruett et al. ................. 315/225

FOREIGN PATENT DOCUMENTS

JP  10-239767 A  9/1998
JP  2001-326086 A  11/2001

* cited by examiner

*Primary Examiner*—W. B. Perkey
*Assistant Examiner*—Rochelle Blackman
(74) *Attorney, Agent, or Firm*—Canon U.S.A. Inc IP Division

(57) ABSTRACT

An image projector comprises a discharge lamp, image projecting means for displaying an image on a screen by emitting light from the discharge lamp, electric power regulating means for regulating the electric power supplied to the discharge lamp, a cooling fan for reducing the temperature of the discharge lamp or the image projecting means, a cooling fan controlling means for controlling the rotation of the cooling fan, and a sensor for detecting a temperature of the discharge lamp or the image projecting means, wherein the rotation of the cooling fan is stopped when the image projector is in a standby mode. In the standby mode, the cooling fan controlling means controls the rotation speed of the cooling fan based on the detected temperature.

16 Claims, 4 Drawing Sheets

PROJECTOR AND IMAGE PROJECTION SYSTEM

BACKGROUND OF THE INVENTION

1. Field of the Invention

The present invention relates to a projector such as a liquid crystal projector for displaying images formed by light emitted from a discharge lamp onto a screen. More specifically, the invention relates to the control of the rotation of a cooling fan in a standby mode in which images are not projected on the screen.

2. Description of the Related Art

A known discharge lamp used as a light source of a projector cannot be turned on immediately after it is turned off. The discharge lamp can only be turned on again one to one and a half minutes after the discharge lamp has been turned off when the temperature of the discharge lamp is sufficiently reduced. When a projector is used in a presentation during a meeting, it might be turned off for a short period of time during a discussion not requiring an image to be projected. Once the discharge lamp is turned off, it cannot be turned immediately back on again to project the image. To turn on the discharge lamp again, the operator has to wait for a period of time. This waiting time causes inconvenience to the operator.

Moreover, when the projector is not required to project images (i.e., when the projector is in standby mode), maintaining the supply of electric power to the discharge lamp at the same level as in a normal mode in order to maintain the discharge state of the discharge lamp so that the discharge lamp continues to be lit is not only wasteful but also shortens the lifespan of the discharge lamp.

Accordingly, Japanese Laid-Open No. 10-239767 discloses a projector having a discharge lamp that shuts off the path of the light emitted from the discharge lamp with a cap and preventing the discharge lamp from going off by supplying up to 50% less electric power. Moreover, Japanese Laid-Open No. 2001-326086 discloses an image apparatus that allows electricity to be conserved by reducing the amount of electric power supplied to the discharge lamp depending on the image being projected.

A lighted discharge lamp in a normal mode continuously generates heat and reaches a high temperature. In addition, the temperature of an optical system (image projecting means) for projecting an image on a screen by the light irradiated from the discharge lamp becomes high. The high temperature of the discharge lamp and the optical system increases in proportion with the amount of electric power supplied to the discharge lamp. Once the temperature exceeds a predetermined temperature, the lifetime and performance of the discharge lamp and the optic system become degraded.

For this reason, a cooling fan is typically used for cooling the discharge lamp and the image projecting means. The cooling ability of the cooling fan can be controlled by changing the rotational speed of the fan. In this way, the rotational speed of the cooling fan is controlled so that the temperatures of the discharge lamp and the image projecting means do not exceed a predetermined temperature while the lighted discharge lamp is in the normal mode. There are also known projectors in which the rotational speed of the cooling fan is reduced in the normal mode and the amount of electric power supplied to the discharge lamp is reduced to conserve electricity.

In known projectors, however, the cooling fan is not turned off in the standby mode while the discharge state of the discharge lamp is maintained and the amount of electric power supplied to the discharge lamp is reduced. When the cooling fan is rotating, it generates noise. The noise of the cooling fan is particularly disturbing if the cooling fan keeps rotating when the projector is switched from the normal mode to the standby mode to have a discussion during a presentation.

SUMMARY OF THE INVENTION

The present invention is directed to an image projector having a cooling fan that does not generate noise in a standby mode in which images are not projected on a screen.

In one aspect of the present invention, the image projector includes a discharge lamp, an image projector unit for displaying an image on a screen by emitting light from the discharge lamp, a cooling fan for reducing the temperature of the discharge lamp or the image projector unit, and a cooling fan controller for controlling the rotation speed of the cooling fan, wherein the controller controls the cooling fan to stop the rotation in the standby mode. In another aspect of the present invention, the image projector controls the rotation speed of the cooling fan based on detected temperature of the discharge lamp or the image projector unit. The image projector includes a sensor for detecting a detected temperature of the discharge lamp and/or the image projector unit. In one embodiment, the controller controls the cooling fan to incrementally reduce the rotational speed until the cooling fan completely stops responsive to the detected temperature being not lower than a lower temperature limit. In another embodiment, the controller controls the fan to incrementally increase the rotation speed responsive to the detected temperature being higher than an upper temperature limit; otherwise, the controller controls the fan to incrementally decrease the rotation speed.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE PREFERRED EMBODIMENTS

First Embodiment

Figure 1:
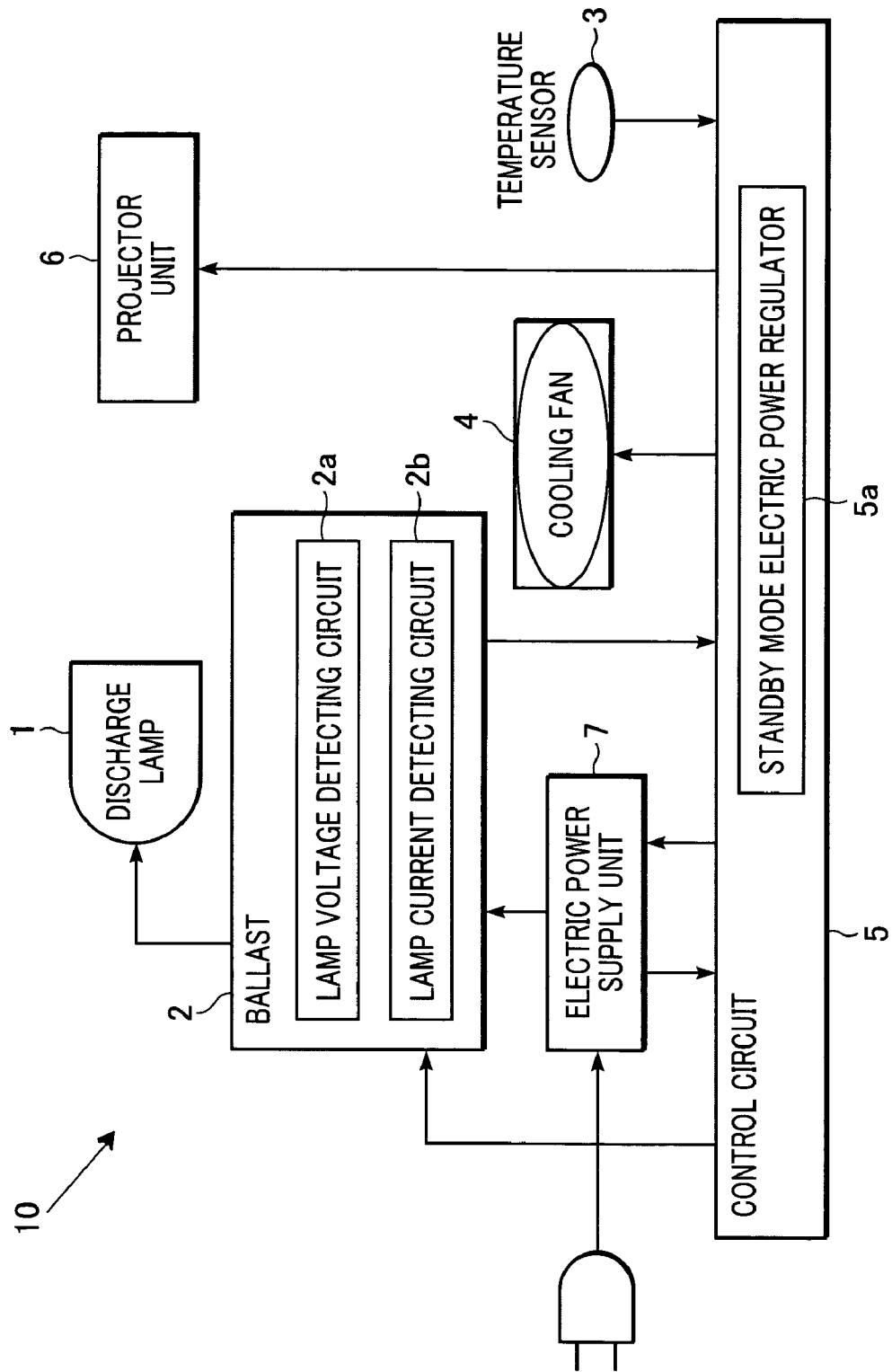
FIG. 1 is a block diagram of an image projector according to one embodiment of the present invention.

FIG. 1 is a block diagram illustrating an image projector 10 according to one embodiment of the present invention.

A discharge lamp 1 is used as a light source of the image projector 10. A ballast 2 regulates electric power supplied to the discharge lamp 1 and controls the lighting of the discharge lamp 1. The ballast 2 includes a lamp voltage detecting circuit 2a for detecting lamp voltage during lighting of the discharge lamp 1, and a lamp current detecting circuit 2b for detecting lamp current during lighting of the discharge lamp 1. A temperature sensor 3 detects the temperature of the discharge lamp 1 and/or in the vicinity of the discharge lamp 1. A cooling fan 4 reduces the temperature of the discharge lamp 1 and/or in the vicinity of the discharge lamp 1.

A projector unit 6 projects an image onto a screen (not shown in the drawing) by emitting light in accordance with image signals sent from a control circuit 5. An electric power supply unit 7 generates electric power for each unit of the image projector 10. For example, the electric power supply unit 7 generates a DC 360V for the ballast 2 and various low voltage powers (5V, 12V, etc.) for the control circuit 5 from a commercial power supply (AC 100V).

The control circuit 5 controls the set power value for the ballast 2 (i.e., the control circuit 5 controls the amount of electric power supplied to the discharge lamp 1 via the ballast 2). The control circuit 5 also processes signals of the projected images received from a PC or video equipment connected to the image projector 10, generates image signals to be sent to a liquid crystal panel, which is part of the projector unit 6, controls rotation of the cooling fan 4 according to the temperature detected by the temperature sensor 3 in a normal mode, and performs an emergency stop of the operation of the ballast 2 or the electric power supply unit 7 when the discharge lamp 1 or the projector unit 6 exceeds a predetermined temperature.

The control circuit 5 includes a standby mode electric power regulator 5a. The standby mode electric power regulator 5a is activated when the image projector 10 is in a standby mode to stop the rotation of the cooling fan 4 and to control the set power value of the ballast 2 according to the temperature detected by the temperature sensor 3 while the cooling fan 4 is not rotating.

In this embodiment, the ballast 2 and the control circuit 5 (including the standby mode electric power regulator 5a) are separate units. Alternatively, these two components of the image projector 10 can be integrated into a single unit. Moreover, this integrated unit may include electric power regulating means for controlling the electric power supplied to the discharge lamp 1 and cooling fan controlling means for controlling the rotation of the cooling fan 4, wherein both means include standby mode electric power regulating means and standby mode cooling fan controlling means.

The lighting process of the discharge lamp 1 is described below.

The ballast 2 starts the lighting process of the discharge lamp 1 by receiving a lamp lighting signal from the control circuit 5. At this time, the ballast 2 instantaneously outputs a high voltage pulse of several kilovolts to several tens of kilovolts. Such a high voltage pulse breaks the insulation between electrodes of the discharge lamp and starts the discharge. After lighting process has started, the lamp voltage detecting circuit 2a and the lamp current detecting circuit 2b detect and monitor the lamp voltage and lamp current, respectively, constantly or at regular intervals.

In the initial phase after the discharge lamp 1 enters a discharge state, the ballast 2 provides constant current control for the discharge lamp 1. While the discharge lamp 1 is controlled, the lamp voltage gradually increases. Then, when the lamp voltage reaches a predetermined value, the ballast 2 switches to constant power control so that, as the lamp voltage increases, the lamp current gradually decreases. The discharge lamp 1 used in this embodiment has a gap of about 1.1 mm between the lamp electrodes, and the lamp voltage stabilizes over 70V.

This will cause the lighting (brightness) of the discharge lamp 1 to be substantially stabilized. It takes about one minute for the discharge lamp 1 to reach this state since initiation of the lighting process.

Figure 2:
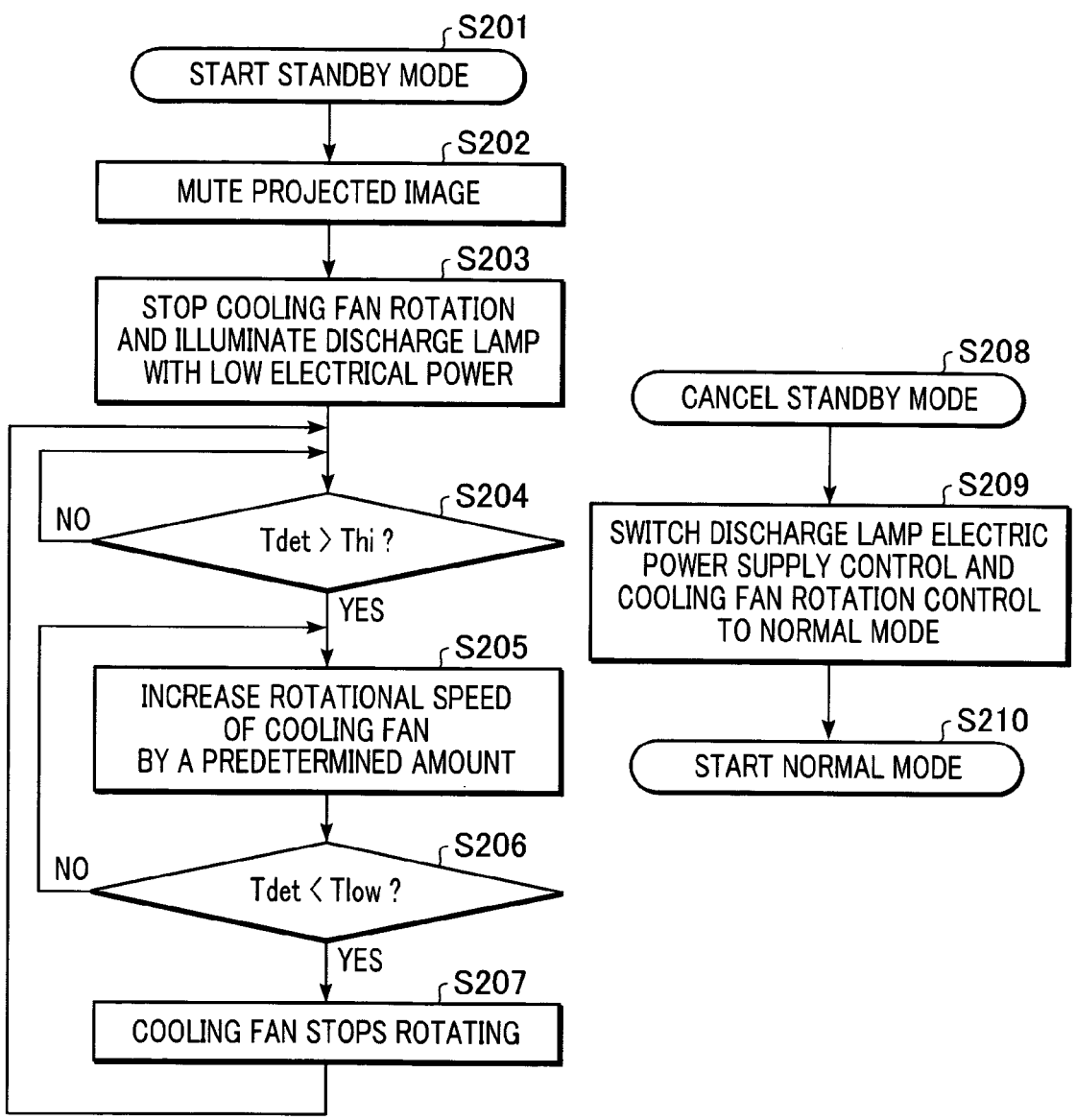
FIG. 2 is a flow chart describing the operation of a standby mode according to a first embodiment of the present invention.

The operation of the image projector 10 in standby mode is described below by referring to FIG. 2. FIG. 2 is a flow chart describing the operation of a standby mode according to a first embodiment of the present invention.

A user can switch from the normal mode to the standby mode by operating a remote control, a main switch on the projector, or a display switch on a menu image projected on the screen (S201). Then, the projected image displayed on the screen is turned off or muted by displaying the projected image in black or on a blue background or by disposing a douser (a shielding plate) for cutting off the light path of the projection (S202).

The temperature of the discharge lamp 1 decreases when the amount of electric power supplied to the discharge lamp 1 is reduced, and the temperature increases when the rotational speed of the cooling fan 4 is reduced. By controlling supply of electric power to the discharge lamp 1 and the rotational speed of the cooling fan 4, the discharge lamp 1 can be lighted with lower electric power supply (S203). The electric power supplied to the discharge lamp 1 is reduced from the amount supplied in the normal mode to a minimum amount $P_{min}$ required to keep the discharge lamp 1 lit. At substantially the same time, the rotational speed of the cooling fan 4 is reduced from that in the normal mode to zero (i.e., the cooling fan 4 is completely stopped). When the cooling fan 4 stops, the noise generated by the cooling fan 4 also stops.

At this time, the discharge lamp 1 is in a low electric power state but continues to generate heat at a lower level than that of the normal mode. When the heat value of the discharge lamp 1 is smaller than or equal to the natural heat dissipation from the outer surface of the image projector chassis, the temperature of the discharge lamp 1 (including projector unit 6 disposed in the vicinity of the discharge lamp 1) does not increase. In other words, in such a case, the noise generated by the cooling fan 4 can be completely suppressed. Preferably, the projector 10 should be designed so that the natural heat dissipation from the outer surface of the projector chassis is high.

When the heat value of the discharge lamp 1 is higher than the natural heat dissipation from the outer surface of the projector chassis, the temperature of the discharge lamp 1 increases. To cope with such a situation, the temperature of the discharge lamp 1 is monitored constantly or at a predetermined interval to check whether the detected temperature $T_{det}$ exceeds a predetermined upper temperature limit $T_{hi}$ (S204). When $T_{det}$ exceeds $T_{hi}$, the rotational speed of the cooling fan 4 is increased at a predetermined rate (S205). The predetermined rate is set in phases to prevent the noise of the cooling fan 4 from becoming too loud. Then, the detected temperature $T_{det}$ is checked to confirm whether $T_{det}$ has fallen below a predetermined lower temperature limit $T_{low}$ (S206). When $T_{det}$ is lower than $T_{low}$, the rotational speed of the cooling fan 4 is reduced to stop the rotation of the cooling fan 4 (S207). Hence, the cooling fan 4 no longer generates noise.

The upper temperature limit $T_{hi}$ and the lower temperature limit $T_{low}$ of the discharge lamp 1 are experimentally predetermined values. If the temperature of the discharge lamp 1 exceeds the upper temperature limit $T_{hi}$, the lifetime and/or the performance of the discharge lamp 1 might be adversely affected by the temperature. $T_{hi}$ is equal to the upper temperature limit of the normal mode. If the temperature of the discharge lamp 1 falls below the lower temperature limit $T_{low}$, the light of the discharge lamp 1 might go off. $T_{low}$ is set so that it is lower than the lower temperature limit of the normal mode in which a relatively high value of electric power is supplied to the discharge lamp 1.

The user can switch from the standby mode to the normal mode by operating the remote control, the main switch on the projector, or a display switch on a menu image projected on the screen (S208). In this way, the regulation of the electric power supplied to the discharge lamp 1 and the control of the rotational speed of the cooling fan 4 return to the normal mode (S209). Since, in the standby mode, the discharge lamp is in a low electric power state instead of being turned off completely, the display image from the projector reaches a predetermined brightness quickly and the projector enters into the normal mode (S210).

Second Embodiment

A second embodiment of the present invention is a variation of the above-mentioned first embodiment. In the first embodiment, the minimum electric power $P_{min}$ required to keep the discharge lamp 1 lit was a known predetermined value experimentally obtained. In step S203, the amount of electric power supplied to the discharge lamp 1 was controlled by setting $P_{min}$ as a target. In this second embodiment, however, the minimum electric power $P_{min}$ required to keep the discharge lamp 1 lit is not known. Instead, the electric power supplied to the discharge lamp 1 is controlled based on the temperature detected by the temperature sensor 3.

Figure 3:
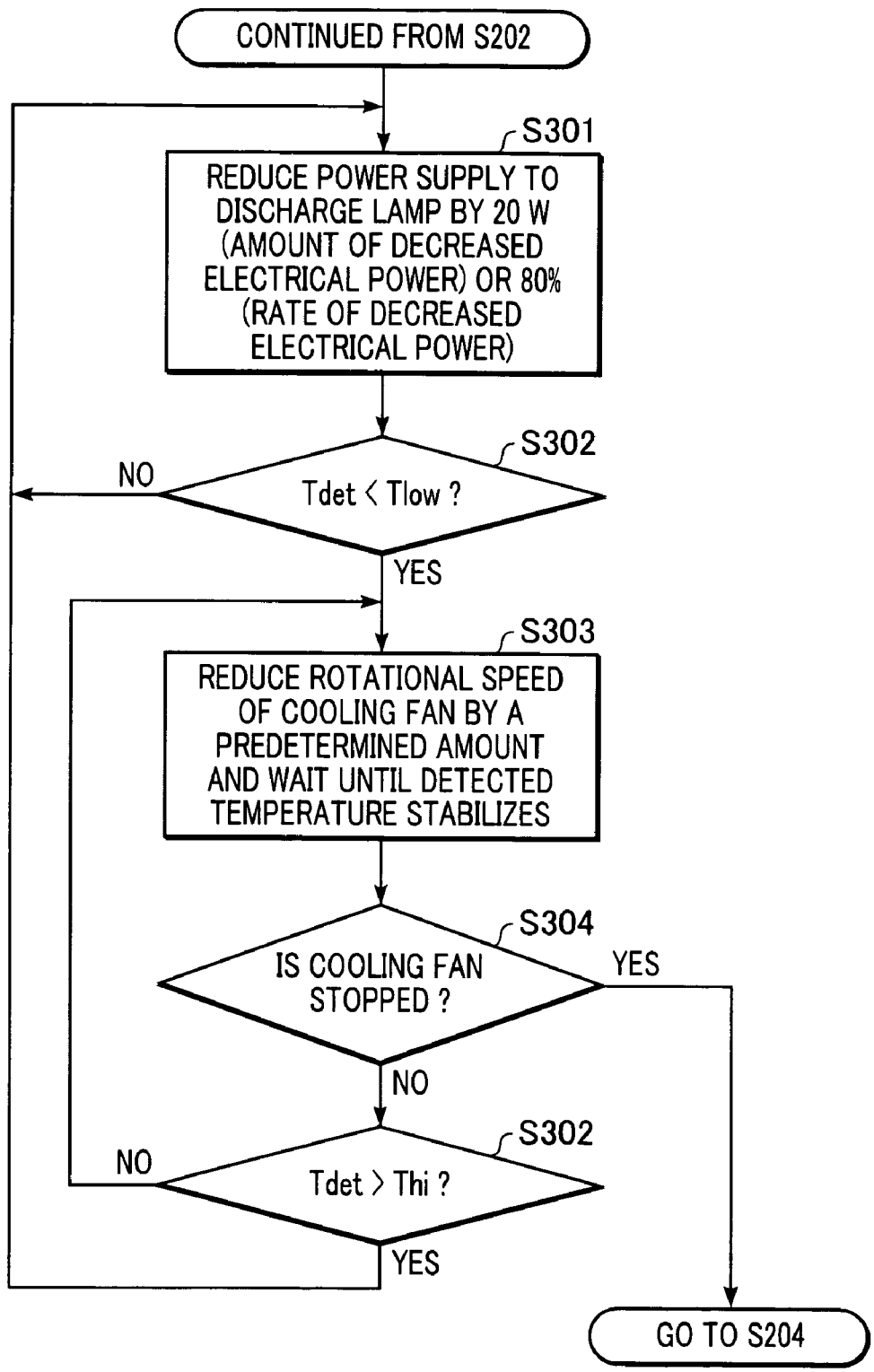
FIG. 3 is a flow chart describing the operation of a standby mode according to a second embodiment of the present invention.

The operation of the image projector 10 in standby mode according to the second embodiment of the present invention is described below by referring to the flow chart in FIG. 3. FIG. 3 is a flow chart describing the operation of a standby mode according to the second embodiment of the present invention.

The processes of starting the standby mode and turning off the projected image are the same as those in the first embodiment. Then, after steps S201 and S202 described in FIG. 2, the electric power supplied to the discharge lamp 1 is gradually reduced and the power value is stabilized (S301). The lamp voltage and the lamp current do not stabilize immediately after the amount of electric power supplied to the discharge lamp 1 is reduced. At first, the lamp voltage and the lamp current change in accordance with the reduction of the electric power supplied to the discharge lamp 1. The lamp voltage and the lamp current overshoot their stable values, but, then, they gradually converge to these stable values. In other words, if the electric power supplied to the discharge lamp 1 is reduced rapidly after the projector enters the standby mode, the lamp current will be reduced too much and cause the discharge lamp to go off. Therefore, the electric power supplied to the discharge lamp 1 is gradually reduced. In particular, in step S301, the electric power supplied to the discharge lamp 1 is reduced to $P_{target}$ obtained by the formulas below:

$$P_{target} = P_{present} - 20, \text{ or}$$

$$P_{target} = P_{present} \times 0.8$$

$P_{target}$ is the target reduced power value of the electric power supplied to the discharge lamp 1. $P_{present}$ is the detected power value before the electric power supplied to the discharge lamp 1 is reduced (which is obtained by multiplying the lamp voltage detected by the lamp voltage detecting circuit and the lamp current detected by the lamp current detecting circuit). In the formulas above, the electric power is reduced by 20 W or by a reduction rate of 80%. Any predetermined value, however, may be selected for these values. After reducing the electric power supplied to the discharge lamp 1, the lamp voltage, the lamp current, and the lamp temperature (including the temperature of the projector unit disposed in the vicinity of the discharge lamp 1) are detected and monitored until their values are stabilized.

After the values are stabilized in step S301, the detected temperature $T_{det}$ is checked to confirm whether it has fallen below the lower temperature limit $T_{low}$ in the standby mode (S302). If $T_{det}$ is not lower than $T_{low}$, the process is returned to step S301 to reduce the electric power supplied to the discharge lamp 1. If $T_{det}$ is lower than $T_{low}$, the rotational speed of the cooling fan 4 is reduced stepwise/incrementally by a predetermined amount, and $T_{det}$ is stabilized (S303).

Then, the rotational speed of the cooling fan 4 is checked to determine whether the rotation has completely stopped (S304). If the rotation of the cooling fan 4 has completely stopped, the process proceeds to step S204 described in FIG. 2. After proceeding to step S204, the rotation of the cooling fan 4 is stopped and the discharge lamp 1 is turned on with reduced electric power. Thus, no noise is generated from the cooling fan 4 in the standby mode.

When the rotation of the cooling fan 4 has not completely stopped, the detected temperature $T_{det}$ is checked to determine whether it has exceeded the upper temperature limit $T_{hi}$ in the standby mode (S305). If $T_{det}$ has not exceed $T_{hi}$, the process is returned to step S303 to reduce the rotational speed of the cooling fan 4 by a predetermined incremental amount. If $T_{det}$ exceeds $T_{hi}$, the process is returned to step S301 to reduce the amount of electric power supplied to the discharge lamp 1. Whether or not the $T_{det}$ exceeds $T_{hi}$, the process eventually proceeds from step S304 to S204, and the cooling fan 4 generates no noise in the standby mode.

Third Embodiment

A third embodiment of the present invention is also a variation of the first embodiment. In the first embodiment, the electric power supplied to the discharge lamp 1 is reduced rapidly by setting the minimum amount of electric power $P_{min}$ as a target, wherein $P_{min}$ is the electric power required to keep the discharge lamp 1 lit and is a value known from step S204. In the third embodiment, however, a margin is set for the minimum amount of electric power $P_{min}$ required to keep the discharge lamp lit. The electric power supplied to the discharge lamp 1 is reduced stepwise/incrementally by taking this margin into consideration.

Figure 4:
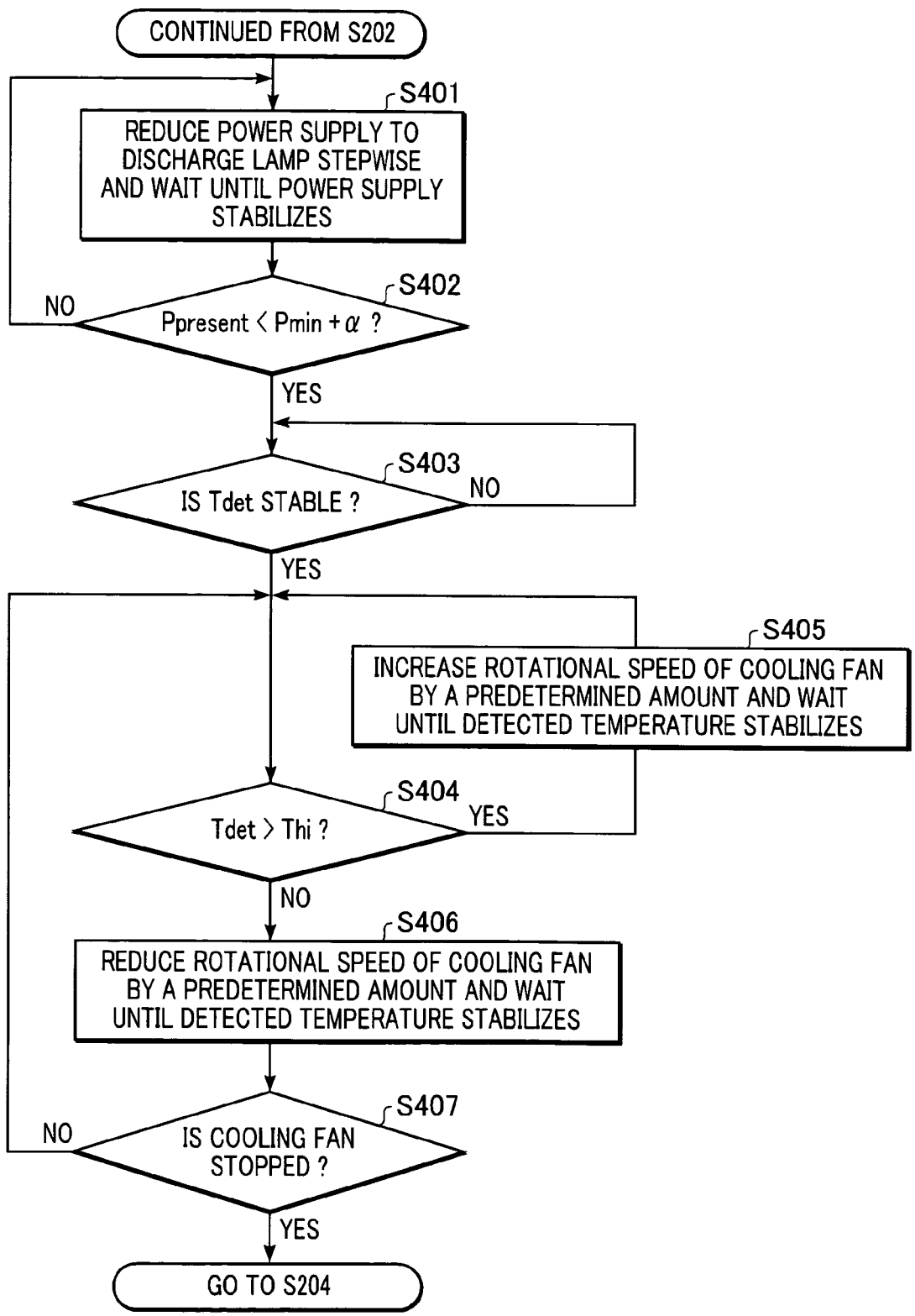
FIG. 4 is a flow chart describing the operation of a standby mode according to a third embodiment of the present invention.

The operation of the projector in standby mode according to the third embodiment of the present invention is described below by referring to the flow chart in FIG. 4. FIG. 4 is a flow chart describing the operation of a standby mode according to a third embodiment of the present invention.

The processes of starting the standby mode and turning off the projected image are the same as in the first embodiment. Then, after steps S201 and S202 described in FIG. 2, the electric power supplied to the discharge lamp 1 is reduced stepwise, and the power value is stabilized (S401). The electric power supplied to the discharge lamp 1 is reduced by applying $P_{target}$ obtained by the formula below:

$$P_{target} = (P_{present} - P_{min})/2 + P_{min}$$

$P_{target}$ is the target power value for reducing the amount of electric power supplied to the discharge lamp 1. $P_{present}$ is the detected power value before the electric power supplied to the discharge lamp 1 is reduced (which is obtained by multiplying the lamp voltage detected by the lamp voltage detecting circuit and the lamp current detected by the lamp current detecting circuit). After reducing the electric power supplied to the discharge lamp 1, the lamp voltage and the lamp current are monitored until their values are stabilized.

After the values are stabilized in step S401, the power value $P_{present}$ at this time (after the amount of electric power supplied is reduced) is checked to confirm whether it has fallen below a threshold ($P_{min}+\alpha$), which is obtained by adding a margin $\alpha$ (e.g. about 10% of $P_{min}$) to the minimum amount of electric power $P_{min}$ required to keep the discharge lamp 1 lit (S402). If $P_{present}$ is not lower than ($P_{min}+\alpha$), the process is returned to step S401 to reduce the electric power supplied to the discharge lamp 1. If $P_{present}$ is lower than ($P_{min}+\alpha$), the temperature of the discharge lamp 1 (including the projector unit disposed in the vicinity of the discharge lamp 1) is detected and checked to confirm whether the detected temperature $T_{det}$ is stabilized (S403).

After $T_{det}$ is stabilized, $T_{det}$ is checked to confirm whether it has exceeded the upper temperature limit $T_{hi}$ (S404). If $T_{det}$ exceeds $T_{hi}$, the rotational speed of the cooling fan 4 is increased stepwise by a predetermined amount, and $T_{det}$ is stabilized (S405). Then, the process is returned to step S404. If $T_{det}$ does not exceed $T_{hi}$, the rotational speed of the cooling fan 4 is reduced stepwise by a predetermined amount, and $T_{det}$ is stabilized (S406). Then, the rotational speed of the cooling fan 4 is checked to determine whether the rotation has completely stopped (S407).

If the rotation of the cooling fan 4 has completely stopped, the process proceeds to step S204 described in FIG. 2. After proceeding to step S204, the rotation of the cooling fan 4 is stopped, and the discharge lamp 1 is turned on with low electric power. Thus, no noise is generated from the cooling fan 4 in the standby mode. If the cooling fan 4 has not completely stopped, the process is returned to step S404. Then, the process eventually proceeds from step S407 to S204, and the cooling fan 4 generates no noise in the standby mode.

In steps S405 and S406, if the rotational speed of the cooling fan 4 is changed often by increasing or decreasing the speed by a predetermined amount, hunting might occur in the rotational speed of the cooling fan 4. Therefore, it is preferable to wait a predetermined amount of time before changing the rotational speed of the cooling fan 4. When switching the rotational speed of the cooling fan 4, it is preferable to preset the rotational speed of the cooling fan 4 in several different steps to cope with the noise generated by the cooling fan 4.

As described above, according to the present invention, the noise generated by the cooling fan 4 can be suppressed during the standby mode when images are not projected onto the screen.

By combining the projector according to the first to third embodiments with an image signal supplying apparatus (e.g. a personal computer, a video camera, or a digital camera), an image projection system suitable for use in meetings, presentations, and film shows is provided. The projector and the image signal supplying apparatus may communicate via a communication cable or a wireless LAN system.

As many apparently widely different embodiments of the present invention can be made without departing from the spirit and scope thereof, it is to be understood that the invention is not limited to the specific embodiments thereof except as defined in the claims.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image projector for projecting an image, the image projector having a normal mode and a standby mode, the image projector comprising:
   a discharge lamp;
   a projector unit selectively projecting the image in the normal mode;
   a cooling fan selectively rotatable at a rotation speed;
   a controller controlling the cooling fan,
   wherein the controller controls the cooling fan to stop rotating in the standby mode; and
   an electric power regulating unit regulating electric power supplied to the discharge lamp, wherein the electric power regulating unit regulates reducing electric power supplied to the discharge lamp in the standby mode.

2. The image projector according to claim 1, further comprising a sensor detecting a detected temperature of at least one of the discharge lamp and the projector unit, and responsive to the detected temperature, the controller controls the rotation speed of the cooling fan in the standby mode.

3. The image projector according to claim 2, wherein in the standby mode the controller controls the cooling fan to reduce the rotation speed by an incremental amount until the cooling fan stops rotating.

4. The image projector according to claim 3, wherein responsive to the sensor detecting the detected temperature lower than a lower temperature limit, the controller controls the cooling fan to reduce the rotation speed by the incremental amount.

5. The image projector according to claim 3, wherein responsive to the sensor detecting the detected temperature lower than an upper temperature limit, the controller controls the cooling fan to reduce the rotation speed by the incremental amount.

6. The image projector according to claim 5, wherein responsive to the sensor detecting the detected temperature higher than the upper temperature limit, the controller controls the cooling fan to increase the rotation speed by the incremental amount.

7. The image projector according to claim 2, wherein responsive to the sensor detecting the detected temperature higher than an upper temperature limit, the controller controls the cooling fan to increase the rotation speed by an incremental amount.

8. The image projector according to claim 7, wherein responsive to the sensor detecting the detected temperature higher than a lower temperature limit, the controller controls the cooling fan to maintain increasing the rotation speed by the incremental amount.

9. An image projection system comprising:
   an image projector for projecting an image, the image projector having a normal mode and a standby mode, the image projector including:
      a discharge lamp;

a projector unit selectively projecting the image in the normal mode;

a cooling fan selectively rotatable at a rotation speed;

a controller controlling the cooling fan, wherein the controller controls the cooling fan to stop rotating in the standby mode;

a sensor detecting a detected temperature of at least one of the discharge lamp and the projector unit, and responsive to the detected temperature, the controller controls the rotation speed of the cooling fan in the standby mode;

an electric power regulating unit regulating electric power supplied to the discharge lamp, wherein the electric power regulating unit regulates reducing electric power supplied to the discharge lamp in the standby mode; and an image signal supplying apparatus coupled to the image projector supplying an image signal to the image projector.

10. A method for controlling an image projector in a standby mode, the image projector having a discharge lamp, a projector unit, and a cooling fan selectively rotatable at a rotation speed, the method including the following steps:

reducing power supply to the discharge lamp;

stopping the rotation speed of the cooling fan;

detecting a detected temperature of at least one of the discharge lamp and the projector unit;

if the detected temperature is higher than an upper temperature limit, incrementally increasing the rotational speed of the cooling fan;

if the detected temperature is not lower than a lower temperature limit, maintaining incrementally increasing the rotation speed of the cooling fan; and if the detected temperature is lower than the lower temperature limit, stopping the rotation speed of the cooling fan.

11. The method according to claim 10, wherein the step of reducing power supply includes reducing power supply to a minimum power to maintain the discharge lamp lit.

12. The method according to claim 10, wherein the step of reducing power supply includes maintaining reducing power supply by an incremental amount as long as the detected temperature is lower than a lower temperature limit.

13. The method according to claim 12, wherein before the step of stopping the rotation speed of the cooling fan, incrementally reducing the rotation speed of the cooling fan until the cooling fan stops rotating.

14. The method according to claim 13, wherein before the step of stopping the rotation speed of the cooling fan, incrementally reducing the rotation speed of the cooling fan if the detected temperature is not higher than an upper temperature limit, otherwise, reducing power supply by the incremental amount.

15. The method according to claim 10, wherein the step of reducing power supply includes maintaining reducing power supply by an incremental amount until a minimum power as reached.

16. The method according to claim 15, wherein after the step of reducing the power supply and before the step of stopping the rotation speed of the cooling fan, incrementally increasing the rotation speed of the cooling fan if the detected temperature is higher than an upper temperature limit, otherwise, incrementally reducing the rotation speed of the cooling fan.

* * * * *